(No Model.)

D. REES.
COMBINED CURRYCOMB AND BRUSH.

No. 592,445. Patented Oct. 26, 1897.

WITNESSES
J. S. Borrew,
A. M. Poynton

INVENTOR:
David Rees,
By John Wedderburn
Attorney

THE NORRIS PETERS CO., PHOTO-LITHO., WASHINGTON, D. C.

UNITED STATES PATENT OFFICE.

DAVID REES, OF CONFIDENCE, MISSOURI.

COMBINED CURRYCOMB AND BRUSH.

SPECIFICATION forming part of Letters Patent No. 592,445, dated October 26, 1897.

Application filed March 16, 1897. Serial No. 627,760. (No model.)

*To all whom it may concern:*

Be it known that I, DAVID REES, a citizen of the United States, residing at Confidence, in the county of Newton and State of Missouri, have invented certain new and useful Improvements in a Combined Currycomb and Brush; and I do hereby declare the following to be a full, clear, and exact description of the invention, such as will enable others skilled in the art to which it appertains to make and use the same.

This invention provides an improved currycomb having certain attachments by which the combs or toothed blades are quickly cleaned by simply operating a lever that extends to within easy reach of the handle of the implement to provide for operating the cleaner by the hand that manipulates the implement.

The invention also contemplates combining a brush with the currycomb, the said brush being removably connected to the supporting-frame of the comb, and when in engagement therewith has an independent movement against the action of a spring.

Having the above objects in view, the invention consists in providing the ordinary currycomb, comprising toothed rings or circular combs connected to a frame, with a pivoted cross-bar having fingers or cleaners which travel at each side of the toothed rings and against the teeth thereof.

The invention further consists in providing a currycomb having toothed rings or circular combs with a pivoted cross-bar carrying fingers which embrace the teeth, a spring connected to the cross-bar, and a lever for turning the bar upon its pivot against the action of the spring.

The invention further consists in the combination, with a currycomb consisting of a series of toothed rings or circular combs, of a brush connected to the frame and having a limited movement at its outer end against the action of the spring.

In the following specification I have entered into a detailed description of the particular construction of each part to enable others skilled in the art to which the invention relates to make use of the same, reference being had to the accompanying drawings and numerals thereon to designate the different parts, and what I consider to be the novel features are more particularly set forth in the claims.

Figure 1:
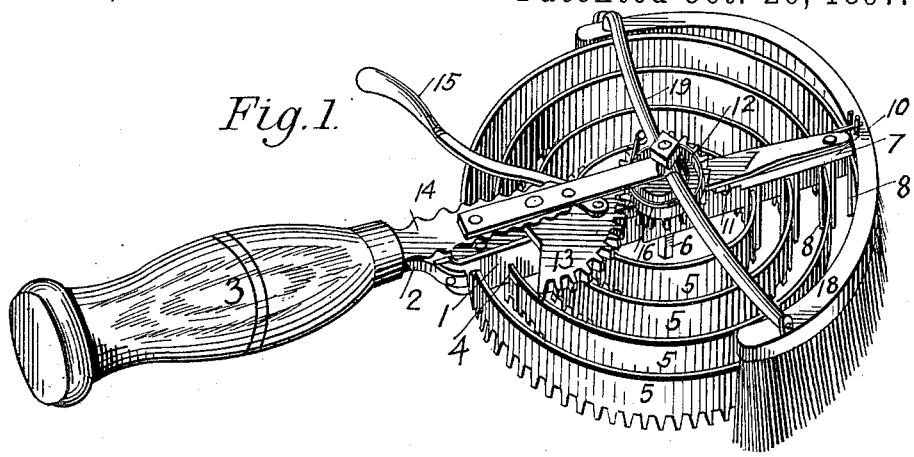
Figure 2:
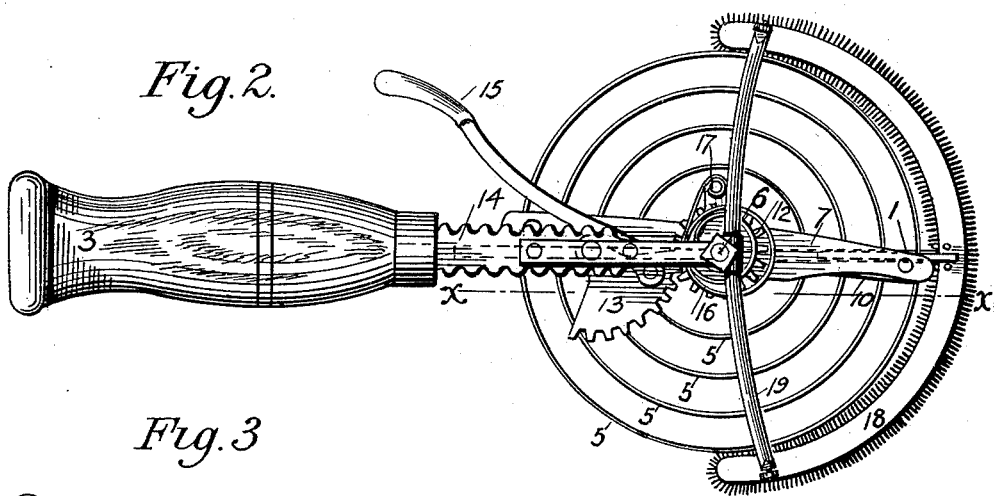
Figure 3:
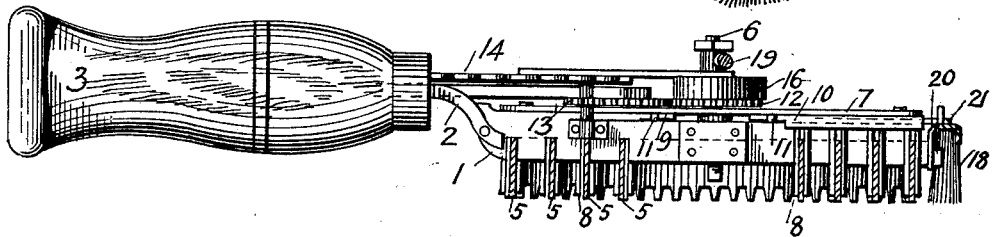
Figure 4:
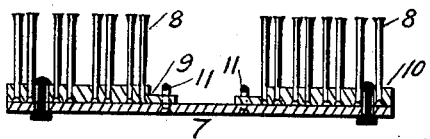

In the accompanying drawings, forming part of this specification, Figure 1 is a perspective view of a combined currycomb and brush constructed in accordance with my invention. Fig. 2 is a plan view. Fig. 3 is a sectional view. Fig. 4 is a detail view of the bar which carries the cleaning-fingers.

Referring to the drawings by numeral, 1 designates the cross-bar which forms the supporting-frame of the implement, said cross-bar being provided at one end with a shank 2, to which is rigidly attached a handle 3.

The cross-bar or supporting-frame 1 is provided with a series of transverse openings or recesses 4, in which are seated and secured a series of toothed rings or circular combs 5, said rings being of different diameters and grouped one within the other, leaving a suitable space between them. Centrally within the cross-bar is an aperture or opening in which is secured a spindle 6, extending above said bar and forming a pivot or bearing-pin for a cross-bar 7. This cross-bar is provided at each end with a series of depending fingers 8, corresponding in number with the number of toothed rings or circular combs, said fingers embracing the combs and extending to the teeth over the sides of which they travel. The lower or free ends of the fingers are preferably flattened, as shown, to lie or travel close to the combs. I have shown the particular manner of connecting the fingers to the cross-bar, which consists in attaching said fingers to independent plates 9 10, pivoted near one end to the said bar and engaging a loop 11 at their other end, the plates having a longitudinal movement upon each other by means of the slots.

Upon the cross-bar which carries the cleaning-fingers is mounted and rigidly attached a pinion or gear-wheel 12, and with said gear-wheel meshes a segment-rack 13, pivoted upon a bearing-pin carried by the cross-bar or supporting-frame, and further supported by a strip or plate 14, which extends from the handle to the spindle 6, an operating-lever 15 extending from the segment-rack to within easy reach of the handle. By this arrangement when the lever is operated the cross-bar carrying the cleaners will be given a half-revolution, so that said fingers will travel over the teeth of the combs, and in order to return the cross-bar to its normal position I provide a coiled spring 16, which is secured to the upper end of the spindle 6 and to an arm 17, projecting upon the movable cross-bar. It will be noted that the spring lies between the plate 14 and the segment-rack, between which parts it is confined.

In connection with a currycomb and cleaning device therefor, constructed as heretofore described, I provide a semicircular brush 18, the ends of which are connected by cross-bar 19, having centrally an opening which engages the upper end of the spindle, being held in such engagement by a nut. The intermediate portion of the back of the semicircular brush is provided on its inner side with a loop 20, with which engages the projecting end of the cross-bar 6 of the currycomb, said bar having a lug at its lower end which contacts with the back of the brush and limits the movement of the latter. The brush is forced downward to the limit of its movement by means of a flat spring 21, secured to the cross-bar 6 and having its free end bearing upon the back of said brush and held in place between two pins. This arrangement provides a construction by which the brush will be permitted to give to a certain extent, the spring having sufficient resiliency to return it to its normal position with respect to the teeth of the currycomb.

The implement herein shown and described, which combines a currycomb and brush and includes a cleaner for the former, provides a very effective contrivance in which the labor of cleaning a horse is considerably reduced, the cleaners being capable of a quick operation which removes the hair and dirt which are gathered by the combs.

Having thus described my invention, what I claim as new, and desire to secure by Letters Patent, is—

1. In combination with a currycomb having toothed rings or circular combs, of a cross-bar pivoted upon the supporting-frame, fingers projecting from said cross-bar to embrace the combs and travel over the sides of the teeth thereof, substantially as shown and for the purpose set forth.

2. In a currycomb, the combination with the toothed rings or circular combs, of a bar pivoted upon the frame of the comb and having depending fingers which embrace the combs and travel over the sides of the teeth, together with means for swinging the bar, substantially as shown and for the purpose set forth.

3. The combination with a currycomb having a series of toothed rings or circular combs, of a cross-bar pivoted upon the currycomb and having depending fingers which embrace the combs and travel over the sides of the teeth, a spring for holding the bar in a normal position, and means for swinging the bar against the action of the spring, substantially as shown and for the purpose set forth.

4. The combination with a currycomb presenting a series of toothed rings or circular combs, of a cross-bar pivoted thereon and having depending fingers which embrace the combs and travel over the teeth thereof, a spring which returns the bar to its normal position, and an operating-lever with interposed mechanism for swinging the bar upon its pivot, substantially as shown and for the purpose set forth.

5. The combination with the toothed rings or circular combs connected to each other, substantially as shown, of a bar pivoted centrally above the combs, fingers depending from said bar and embracing the combs to travel over the sides of the teeth thereof, together with a spring connected with the bar, a pinion also attached to the bar, and a segment-rack in engagement with the pinion and having an operating-lever, the parts being constructed and organized substantially as shown and for the purpose set forth.

6. In a currycomb, the combination with a series of toothed rings or circular combs connected to each other, substantially as shown, of a cross-bar centrally pivoted at the back of the combs and connected with mechanism for swinging the same, of plates carrying depending fingers to embrace the combs and travel over the sides of the teeth, said plates being pivoted near one end to the cross-bar, and loops or bails engaging the opposite ends of the plates, substantially as shown and described.

7. In combination with a currycomb constructed substantially as shown, of a semicircular brush connected thereto by a cross-bar and having a swinging movement with respect to the currycomb, together with a spring for throwing the brush to the limit of its movement in one direction, substantially as shown and described.

8. The combination with a currycomb constructed substantially as shown, of a semicircular brush having a cross-bar connecting the ends thereof and providing means for attaching the brush to the comb, a loop attached to an intermediate portion of the brush and engaged by a projection of the comb, and a flat spring carried by the comb and bearing upon the brush, substantially as shown and for the purpose set forth.

In testimony whereof I have signed this specification in the presence of two subscribing witnesses.

DAVID REES.

Witnesses:
EDWARD REES,
HUGH THRASHER.